(12) United States Patent
Ash et al.

(10) Patent No.: US 9,471,505 B2
(45) Date of Patent: Oct. 18, 2016

(54) EFFICIENT MULTI-THREADED JOURNAL SPACE RECLAMATION

(71) Applicant: International Business Machines Corporation, Armonk, NY (US)

(72) Inventors: Kevin J. Ash, Tucson, AZ (US); Lokesh M. Gupta, Tucson, AZ (US); Carol S. Mellgren, Tucson, AZ (US); Alfred E. Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 14/616,668

(22) Filed: Feb. 7, 2015

(65) Prior Publication Data

US 2016/0232102 A1     Aug. 11, 2016

(51) Int. Cl.
*G06F 12/00* (2006.01)
*G06F 12/08* (2016.01)
*G06F 12/12* (2016.01)
*G06F 3/06* (2006.01)

(52) U.S. Cl.
CPC ......... *G06F 12/0891* (2013.01); *G06F 3/0689* (2013.01); *G06F 12/0802* (2013.01); *G06F 12/0804* (2013.01); *G06F 12/12* (2013.01); *G06F 12/123* (2013.01); *G06F 2212/1041* (2013.01); *G06F 2212/60* (2013.01); *G06F 2212/69* (2013.01)

(58) Field of Classification Search
CPC .......... G06F 12/0802; G06F 12/0891; G06F 12/0804; G06F 12/12; G06F 12/123; G06F 2212/1041; G06F 2212/60; G06F 2212/69; G06F 3/0689
See application file for complete search history.

(56) References Cited

U.S. PATENT DOCUMENTS

| 2006/0106971 | A1 | 5/2006 | Mahar et al. |
| 2012/0239869 | A1 | 9/2012 | Chiueh et al. |
| 2014/0281131 | A1 | 9/2014 | Joshi et al. |
| 2014/0304479 | A1* | 10/2014 | Benhase ............... G06F 12/122 711/136 |

OTHER PUBLICATIONS

G. R. Ganger et al., "Soft Updates: A Solution to the Metadata Update Problem in File Systems," ACM Transactions on Computer Systems, v.18, n.2, May 2000, pp. 127-153.

* cited by examiner

*Primary Examiner* — Shawn X Gu
(74) *Attorney, Agent, or Firm* — Nelson and Nelson; Daniel P. Nelson; Alexis V. Nelson

(57) ABSTRACT

A method for reclaiming space in a journal is disclosed. In one embodiment, such a method includes identifying a plurality of ranks in a storage system. The method creates a destage wait list for each rank, where the destage wait list identifies metadata tracks to destage from a cache to the corresponding rank. The method dispatches one or more threads for each destage wait list. The threads destage metadata tracks identified in the destage wait lists from the cache to the corresponding ranks. In certain embodiments, the method moves metadata tracks to the destage wait lists only if performing such will not cause occupied space in the journal to fall below a low watermark. Once metadata tracks are destaged from the cache, the method releases, from the journal, entries associated with the destaged metadata tracks. A corresponding system and computer program product are also disclosed.

20 Claims, 6 Drawing Sheets

EFFICIENT MULTI-THREADED JOURNAL SPACE RECLAMATION

BACKGROUND

1. Field of the Invention

This invention relates to systems and methods for more efficiently reclaiming space in a journal used to track metadata changes.

2. Background of the Invention

In storage systems such as the IBM DS8000™ enterprise storage system, a journal is maintained for Copy Services (CS) transactions. The journal is stored in non-volatile memory (NVS). When a metadata track is modified in the cache of the DS8000™ the metadata track does not need to be destaged immediately for the transaction to be considered complete. Instead a copy of the modification to the metadata track is saved in a journal entry (or block). If power is interrupted to the DS8000™, any modifications to the metadata track may be recovered from the journal. A metadata track may be modified multiple times before it is destaged from the cache. All of the modifications to the metadata track may be stored as a chain of journal blocks. When a metadata track is eventually destaged, all of the journal blocks associated with metadata track may be released.

As metadata tracks are modified, journal space is consumed and at some point the journal will become full. When the journal is full, space needs to be reclaimed in the journal prior to completing any new transactions. In the current implementation of the DS8000™, a significant number of threads are dedicated to completing new transactions and recording metadata changes in the journal. However, there are only two threads (i.e., an LRU Controller thread and a Journal Cleaner thread associated with Copy Services) that dedicate time and resources to reclaiming journal space. This makes the journal a potential performance bottleneck in the DS8000™.

In current implementations, the LRU Controller thread is responsible for handling cache resources in addition to cleaning the journal. Thus, the LRU Controller thread may need to split CPU cycles between multiple tasks, thereby limiting its ability to fully dedicate its attention to cleaning the journal. The LRU Controller thread is further limited in that it only references a single LRU (Least Recently Used) list to clean journal blocks. This LRU list is used for all metadata tracks including metadata tracks whose changes are not recorded in the journal (i.e., "non-journaled" metadata tracks). Thus, when referencing the LRU list to clean the journal, the LRU Controller thread may need to repeatedly skip over and ignore "non-journaled" metadata tracks, further reducing efficiency. The Journal Cleaner thread also suffers from inefficiencies in that, when it cleans blocks associated with a particular metadata track from the journal, it needs to wait for the metadata track to be destaged from cache to disk prior to moving on to blocks associated with other metadata tracks.

In view of the foregoing, what are needed are systems and methods to more efficiently reclaim space in the above-described journal. Ideally, such system and methods will be able to dedicate additional resources to cleaning the journal if and when they are needed. Further needed are systems and methods to ensure that journal space is used in an efficient and effective manner.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently reclaim space in a journal used to track metadata changes. The features and advantages of the invention will become more fully apparent from the following description and appended claims, or may be learned by practice of the invention as set forth hereinafter.

Consistent with the foregoing, a method for more efficiently reclaiming space in a journal used to track metadata changes is disclosed. In one embodiment, such a method includes identifying a plurality of ranks in a storage system. The method creates a destage wait list for each rank, where the destage wait list identifies metadata tracks to destage from a cache to the corresponding rank. The method dispatches one or more threads for each destage wait list. The threads destage metadata tracks identified in the destage wait lists from the cache to the corresponding ranks. In certain embodiments, the method moves metadata tracks to the destage wait lists only if performing such will not cause occupied space in the journal to fall below a low watermark. Once metadata tracks are destaged from the cache, the method releases, from the journal, entries associated with the destaged metadata tracks.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
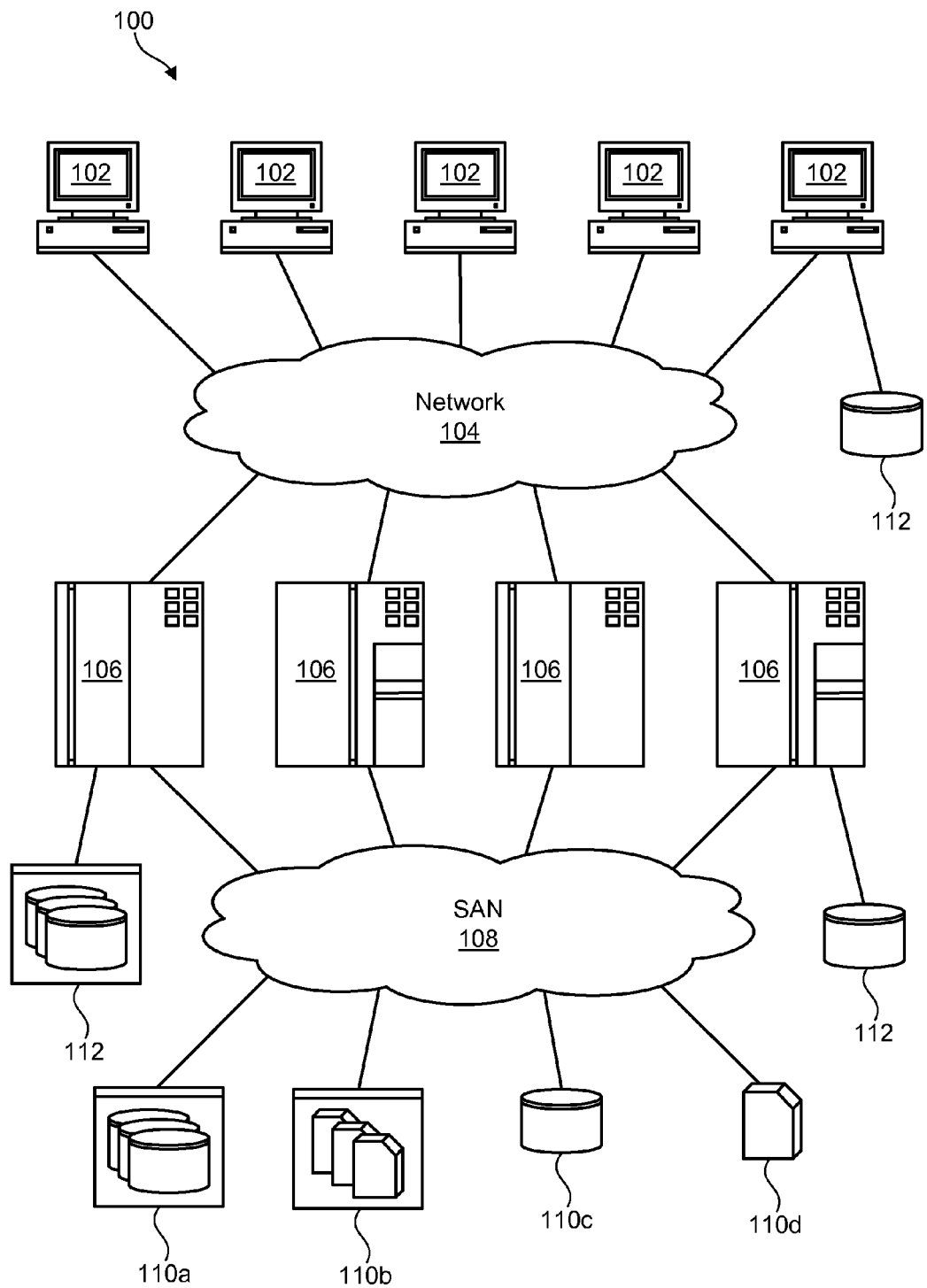
FIG. 1 is a high-level block diagram showing one example of a network environment where a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where embodiments of the invention may operate. The network architecture 100 is presented only by way of example and not limitation. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
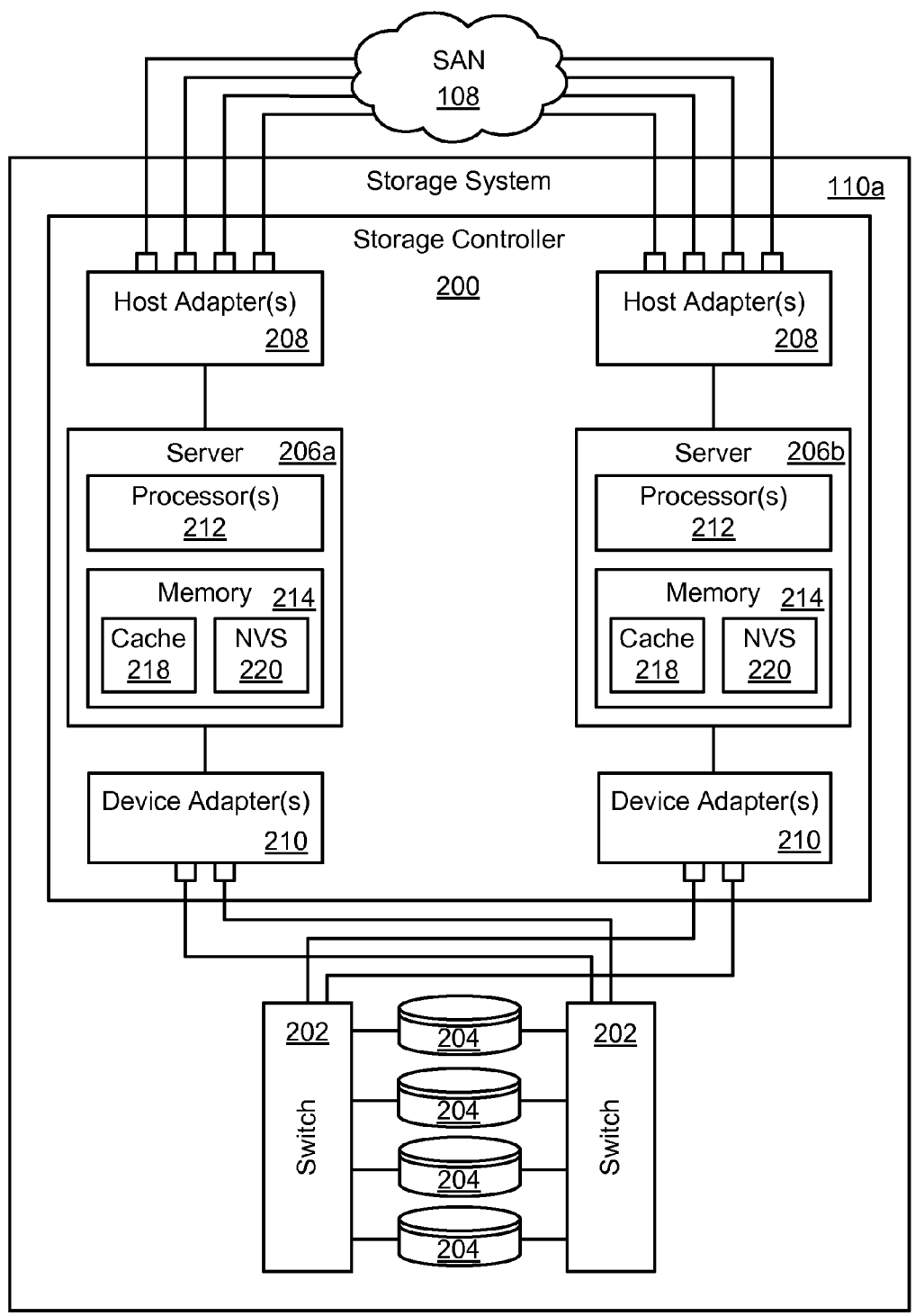
FIG. 2 is a high-level block diagram showing one example of a storage system where a system and method in accordance with the invention may be implemented.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems or groups of storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b provide redundancy to ensure that data is always available to connected hosts 106. Thus, when one server 206a fails, the other server 206b may pick up the I/O load of the failed server 206a to ensure that I/O is able to continue between the hosts 106 and the storage drives 203, 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
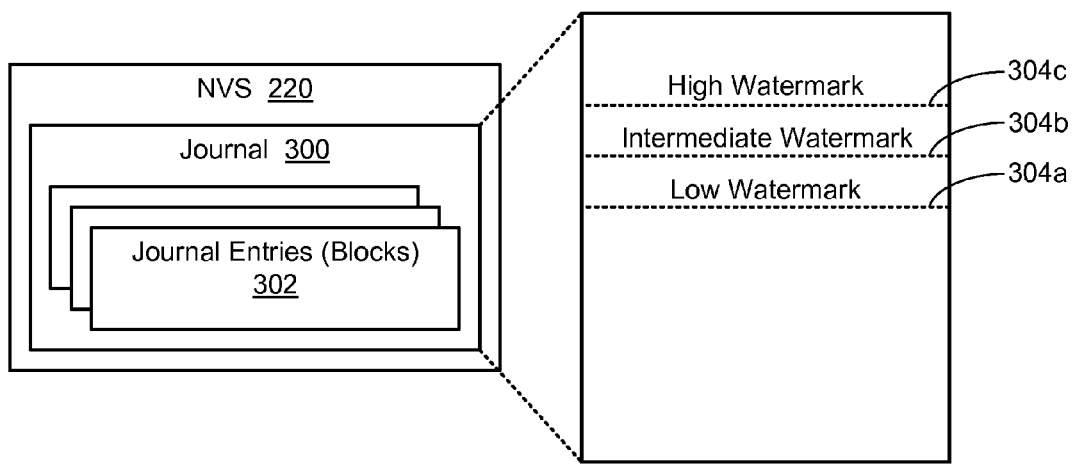
FIG. 3 is a high-level block diagram showing a journal in non-volatile storage (NVS), wherein the journal comprises various watermarks.
Figure 4:
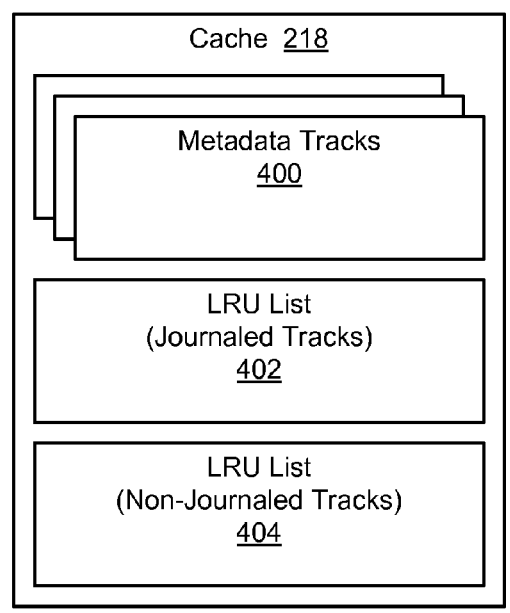
FIG. 4 is a high-level block diagram showing metadata tracks in cache, as well as an LRU list dedicated to "journaled" metadata tracks.

Referring to FIGS. 3 and 4, as previously mentioned, in storage systems 110 such as the IBM DS8000™ enterprise storage system 110, a journal 300 is maintained for Copy Services (CS) transactions. The journal 300 is stored in non-volatile memory (NVS) 220. When a metadata track 400 is modified in the cache 218 of the DS8000™, the metadata track 400 does not need to be destaged immediately to the storage drives 204 for the transaction to be considered complete. Instead a copy of the modification to the metadata track 400 is saved in a journal entry 302 (or block 302). If power is interrupted to the DS8000™, any modifications to the metadata track 400 may be recovered from the journal 300. A metadata track 400 may be modified multiple times before it is destaged from cache 218 to the storage drives 204. All of the modifications to the metadata track 400 may be stored as a chain of journal blocks 302. When a metadata track 400 is eventually destaged, all of the journal blocks 302 associated with metadata track 400 may be released in the journal 300. When the journal 300 is full, space needs to be reclaimed in the journal 300 prior to completing any new transactions.

In order to more efficiently use and reclaim space in the journal 300, various watermarks 304 may be established. For example, a low watermark 304a, intermediate watermark 304b, and high watermark 304c may be established in the journal 300. In certain embodiments, the low watermark 304a may be established at about seventy percent of the journal capacity, the intermediate watermark 304b may be established at about seventy-five percent of the journal capacity, and the high watermark 304c may be established at about eighty percent of the journal capacity. These levels may vary in different embodiments and are not intended to be limiting.

In certain embodiments, systems and methods in accordance with the invention may try to keep the used space in the journal 300 above the low watermark 304a to more efficiently utilize space in the journal 300. Reclaiming space beyond the low watermark 304a may cause the journal 300 to be insufficiently utilized and, as a result, cause excessive destages from the cache 218 to the storage drives 204. Thus, the low watermark 304a may in certain embodiments indicate a desired minimum usage level of the journal 300. The manner in which the low watermark 304a and other watermarks 304b, 304c are used to manage space in the journal 300 will be described in more detail hereafter.

Instead of using a single LRU list for both "journaled" and "non-journal" metadata tracks 400, systems and methods in accordance with the invention may implement a separate LRU list 402 dedicated to "journaled" metadata tracks 400. This will eliminate the need to skip over and ignore "non-journaled" metadata tracks, as previously discussed. As will be explained in more detail hereafter, in certain embodiments, a dedicated thread (i.e., a "journal reclaim thread") may be configured to scan the list of "journaled" metadata tracks 400 in the LRU list 402. In certain embodiments, a separate LRU list 404 may be provided for "non-journaled" metadata tracks 400.

Figure 5:
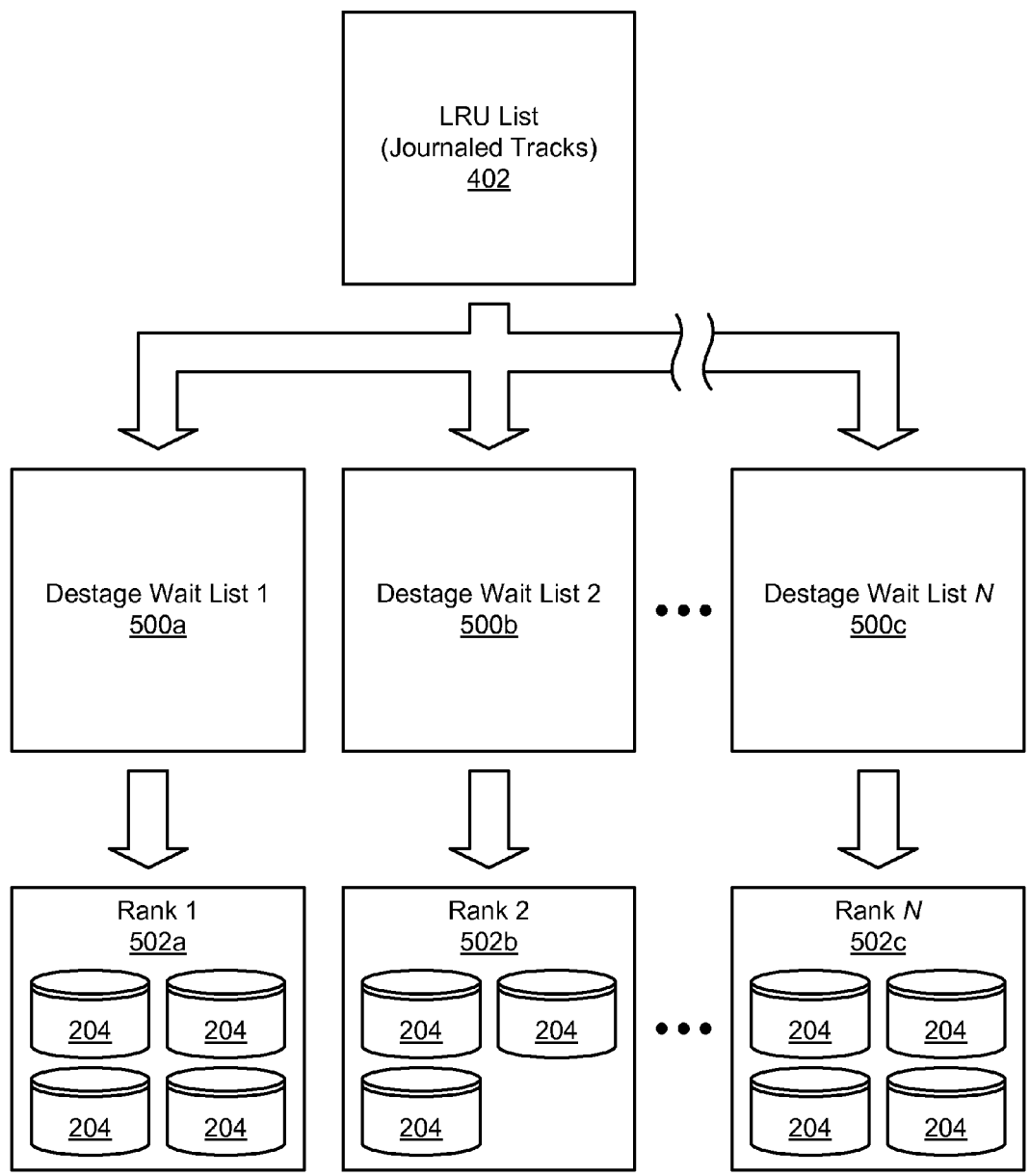
FIG. 5 is a high-level block diagram showing movement of journaled metadata tracks from the LRU list to multiple destage wait lists.

Referring to FIG. 5, in addition to establishing the aforementioned watermarks 304 and dedicated LRU list 402, systems and methods in accordance with the invention may establish multiple destage wait lists 500 for destaging metadata tracks 400 from cache 218 to the storage drives 204. In certain embodiments, a destage wait list 500 may be created for each rank 502 (i.e., group of one or more storage drives 204 organized into a RAID or other relationship) in a storage system 110. When metadata tracks 400 are added (i.e., listed) in a destage wait list 500, one or more threads may be dispatched to move the metadata tracks 400 listed in the destage wait list 500 from the cache 218 to the corresponding rank 502. In certain embodiments, a thread is dispatched for each N metadata tracks 400 in a destage wait list 500. A count indicating the number of metadata tracks 400 in a destage wait list 500 may be maintained for each destage wait list 500.

In certain embodiments, each of the threads associated with a destage wait list 500 may operate in parallel to destage metadata tracks 400 from the cache 218 to the associated rank 502. Similarly, threads associated with different destage wait lists 500 may also operate in parallel to destage metadata tracks 400. In this way, the number of threads dedicated to destaging metadata tracks 400 from the cache 218 to the storage drives 204 may be scaled in accordance with the number of non-empty destage wait lists 500 as well as the number of metadata tracks 400 in each destage wait list 500.

Figure 6:
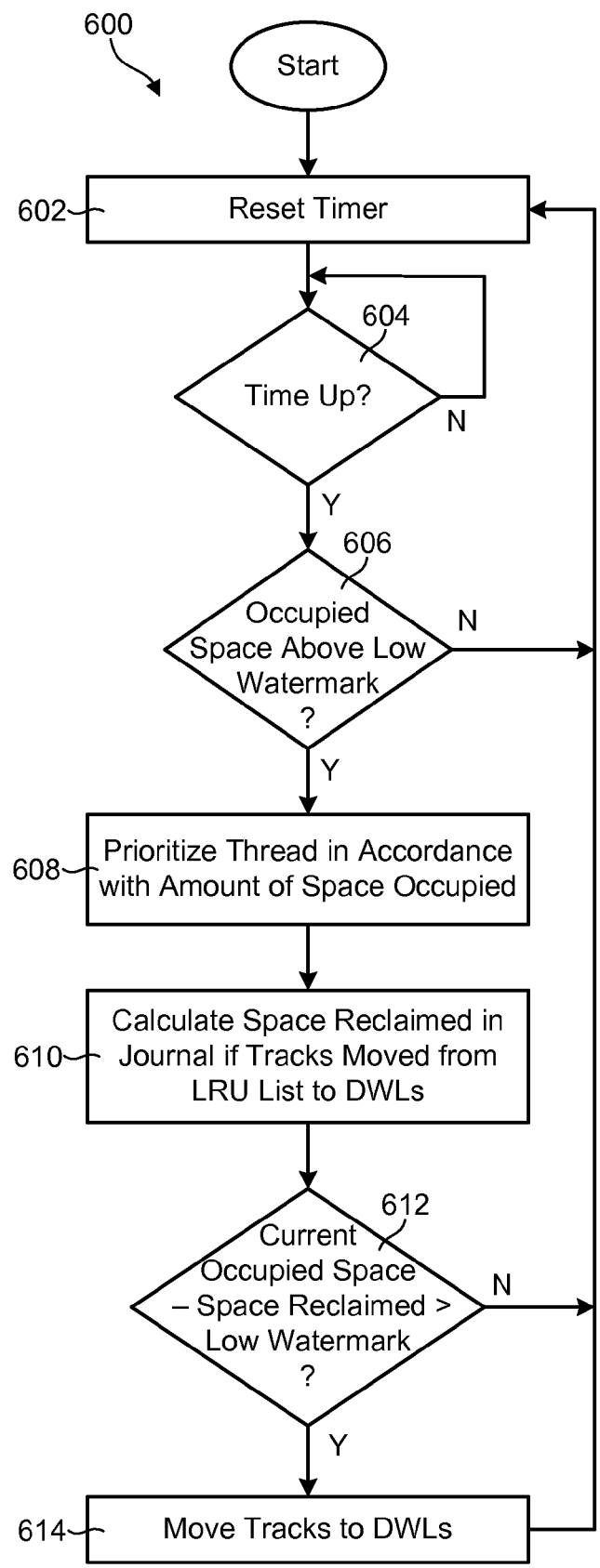
FIG. 6 is a flow diagram showing one embodiment of a method for moving metadata tracks to the destage wait lists.

Referring to FIG. 6, one embodiment of a method 600 for moving metadata tracks 400 from the LRU list 402 to the destage wait lists 500 is illustrated. This method 600 uses the watermarks 304 previously discussed to manage space in the journal 300 and trigger various actions. In certain embodiments, such a method 600 may be executed by a thread (i.e., a "journal reclaim thread") dedicated to reclaiming space in the journal 300. As shown, in certain embodiments, a timer may be established for the journal reclaim thread. The journal reclaim thread may be configured to wake up on expiration of the timer. For example, the journal reclaim thread may be configured to wake up every one second to evaluate an amount of occupied space in the journal 300 relative to the watermarks 304 previously discussed.

As shown, the method 600 may begin by initially resetting 602 the timer. The method 602 may then determine 604 whether the time is up. If the time is up, the journal reclaim thread wakes up and determines 606 whether the occupied space in the journal 300 is above the low watermark 304a. If the occupied space is not above the low watermark 304a, the method 600 resets 602 the timer and the journal reclaim thread goes back to sleep. However, if the occupied space in the journal 300 is above the low watermark 304a, the method 600 prioritizes 608 the journal reclaim thread in accordance with the amount of space that is occupied. This step 608 will be discussed in additional detail in association with FIG. 7.

The method 600 then calculates 610 an amount of space that will be reclaimed in the journal 300 if the metadata tracks 400 listed in the LRU list 402 are moved to the destage wait lists 500 (thereby causing the metadata tracks 400 listed in the destage wait lists 500 to be moved from the cache 218 to the storage drives 204, as previously discussed). This may be accomplished, for example, by dividing a number of metadata tracks 400 that will be moved to the destage wait lists 500 by an average number of journal blocks 302 that are used by a metadata track 400. Other methods for calculating an amount of space that will be reclaimed from the journal 300 may be used and are within the scope of the invention. The method 600 then determines 612 if reclaiming the amount of space calculated in step 610 will cause the amount of occupied space in the journal 300 to fall below the low watermark 304a. This may be accomplished, for example, by subtracting the calculated amount of reclaimed space from the current amount of occupied space in the journal 300 and determining whether the result will leave the amount of occupied space in the journal 300 above the low watermark 304a.

If reclaiming the amount of space calculated in step 610 would cause the journal 300 to fall below the low watermark 304a, the method 600 resets 602 the timer and the journal reclaim thread goes back to sleep. If, however, reclaiming the amount of space calculated in step 610 will not cause the amount of occupied space in the journal 300 to fall below the low watermark 304a, the method 600 moves 614 the metadata tracks 400 in the LRU list 402 to the destage wait lists 500. Once moved to the destage wait lists 500, one or more threads will be dispatched to move the metadata tracks 400 listed in the destage wait lists 500 from the cache 218 to the corresponding ranks 502. Once the metadata tracks 400 are moved, entries or blocks 302 associated with the metadata tracks 400 may be released in the journal 300, thereby freeing up space therein.

Figure 7:
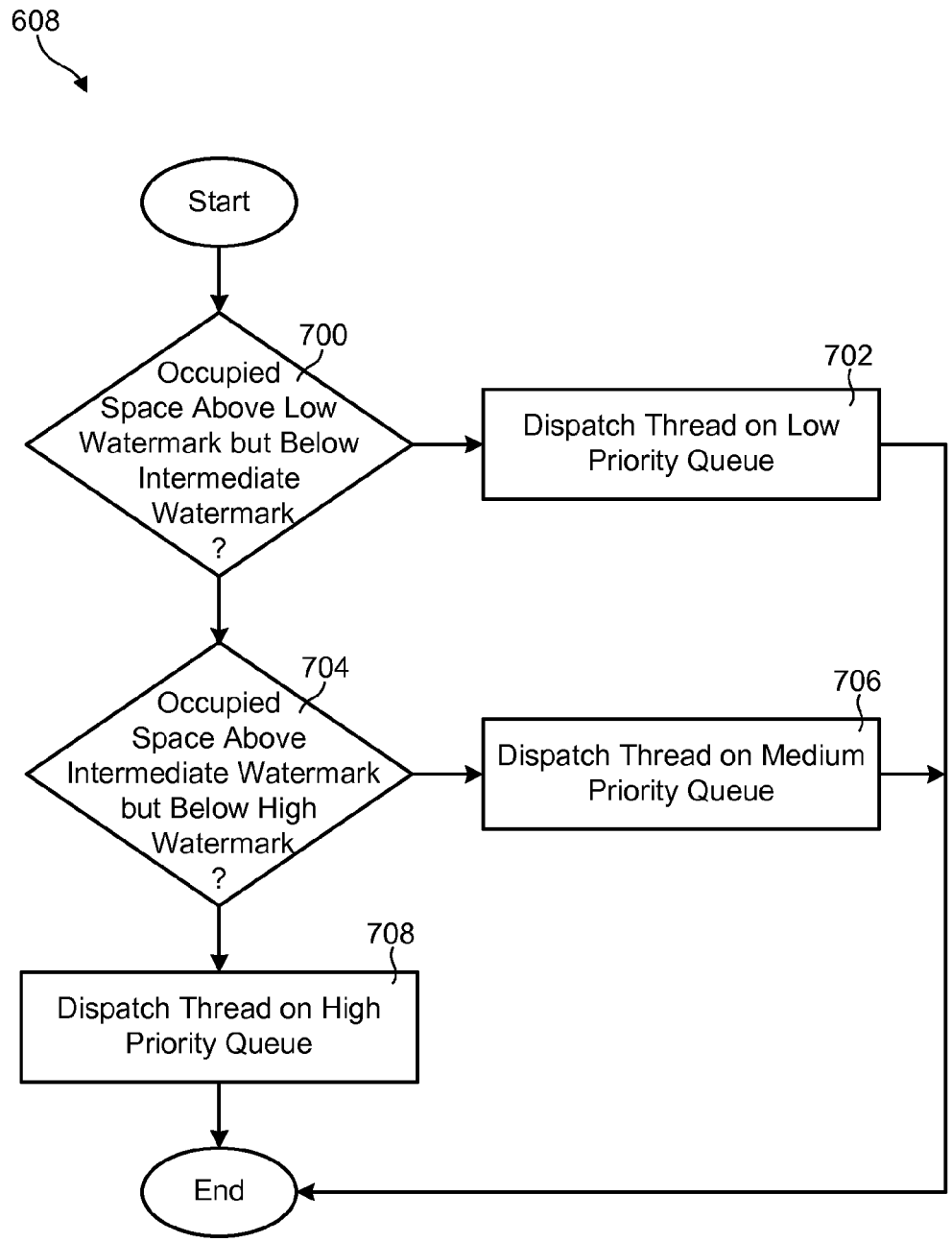
FIG. 7 is a flow chart showing one embodiment of a method for prioritizing a thread for moving metadata tracks to the destage wait lists.

Referring to FIG. 7, one embodiment of a method 608 for prioritizing the journal reclaim thread, as previously discussed, is illustrated. In general, such a method 608 may be used to adjust the priority of the journal reclaim thread in accordance with the amount of occupied space in the journal 300. The more full the journal 300, the greater the priority allocated to the journal reclaim thread. As shown, in one embodiment, such a method 608 may initially determine 700 whether the amount of occupied space in the journal 300 is above the low watermark 304a but below the intermediate watermark 304b. If so, the method 608 dispatches 702 the journal reclaim thread on a low priority queue. If, at step 704, the amount of occupied space in the journal 300 is above the intermediate watermark 304b but below the high watermark 304c, the method 608 dispatches 706 the journal reclaim thread on a medium priority queue. Finally, if the amount of occupied space in the journal 300 is above the high watermark 304c, the journal reclaim thread is dispatched 708 on a high priority queue. Using these tiered levels of priority, the disclosed method 608 will ideally prevent the journal 300 from ever encountering a scenario where it fills up and prevents transactions from being executed.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to more efficiently reclaim space in a journal configured to track metadata changes, the method comprising:
   identifying a plurality of ranks in a storage system;
   creating a destage wait list for each rank, the destage wait list identifying tracks to destage from a cache to the corresponding rank;
   dispatching separate threads for each non-empty destage wait list, each thread destaging tracks identified in a non-empty destage wait list from the cache to the corresponding rank; and
   releasing, from the journal, journal entries associated with destaged tracks.

2. The method of claim 1, further comprising moving tracks to the destage wait lists from a least recently used (LRU) list.

3. The method of claim 2, wherein moving the tracks to the destage wait lists comprises moving the tracks to the destage wait lists only if performing such will not cause occupied space in the journal to fall below a low watermark.

4. The method of claim 2, wherein moving the tracks to the destage wait lists comprises performing such at a low priority if occupied space in the journal is above a low watermark but below an intermediate watermark.

5. The method of claim 2, wherein moving the tracks to the destage wait lists comprises performing such at an intermediate priority if occupied space in the journal is above an intermediate watermark but below a high watermark.

6. The method of claim 2, wherein moving the tracks to the destage wait lists comprises performing such at a high priority if occupied space in the journal is above a high watermark.

7. The method of claim 1, wherein dispatching separate threads for each non-empty destage wait list comprises dispatching, for each non-empty destage wait list, a thread for each N tracks in the non-empty destage wait list.

8. A computer program product to more efficiently reclaim space in a journal configured to track metadata changes, the computer program product comprising a non-transitory computer-readable storage medium having computer-usable program code embodied therein, the computer-usable program code comprising:
   computer-usable program code to identify a plurality of ranks in a storage system;
   computer-usable program code to create a destage wait list for each rank, the destage wait list identifying tracks to destage from a cache to the corresponding rank;
   computer-usable program code to dispatch separate threads for each non-empty destage wait list, each thread destaging tracks identified in a non-empty destage wait list from the cache to the corresponding rank; and
   computer-usable program code to release, from the journal, journal entries associated with destaged tracks.

9. The computer program product of claim 8, further comprising computer-usable program code to move tracks to the destage wait lists from a least recently used (LRU) list.

10. The computer program product of claim 9, wherein moving the tracks to the destage wait lists comprises moving the tracks to the destage wait lists only if performing such will not cause occupied space in the journal to fall below a low watermark.

11. The computer program product of claim 9, wherein moving the tracks to the destage wait lists comprises performing such at a low priority if occupied space in the journal is above a low watermark but below an intermediate watermark.

12. The computer program product of claim 9, wherein moving the tracks to the destage wait lists comprises performing such at an intermediate priority if occupied space in the journal is above an intermediate watermark but below a high watermark.

13. The computer program product of claim 9, wherein moving the tracks to the destage wait lists comprises performing such at a high priority if occupied space in the journal is above a high watermark.

14. The computer program product of claim 8, wherein dispatching separate threads for each non-empty destage wait list comprises dispatching, for each non-empty destage wait list, a thread for each N tracks in the non-empty destage wait list.

15. A system to more efficiently reclaim space in a journal configured to track metadata changes, the system comprising:
   at least one processor;
   at least one memory device operably coupled to the at least one processor and storing instructions for execution on the at least one processor, the instructions causing the at least one processor to:
   identify a plurality of ranks in a storage system;
   create a destage wait list for each rank, the destage wait list identifying tracks to destage from a cache to the corresponding rank;
   dispatch separate threads for each non-empty destage wait list, each thread destaging tracks identified in a non-empty destage wait list from the cache to the corresponding rank; and
   release, from the journal, journal entries associated with destaged tracks.

16. The system of claim 15, wherein the instructions further cause the at least one processor to move tracks to the destage wait lists from a least recently used (LRU) list.

17. The system of claim 16, wherein moving the tracks to the destage wait lists comprises moving the tracks to the destage wait lists only if performing such will not cause occupied space in the journal to fall below a low watermark.

18. The system of claim 16, wherein moving the tracks to the destage wait lists comprises performing such at a low priority if occupied space in the journal is above a low watermark but below an intermediate watermark.

19. The system of claim 16, wherein moving the tracks to the destage wait lists comprises performing such at an intermediate priority if occupied space in the journal is above an intermediate watermark but below a high watermark.

20. The system of claim 16, wherein moving the tracks to the destage wait lists comprises performing such at a high priority if occupied space in the journal is above a high watermark.

* * * * *